(12) United States Patent
Swann et al.

(10) Patent No.: US 6,213,512 B1
(45) Date of Patent: Apr. 10, 2001

(54) SEAT BELT TIGHTENING APPARATUS

(75) Inventors: Timothy A. Swann; Patrick A. Swann; Lauren E. Swann, all of Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/211,033

(22) Filed: Dec. 14, 1998

(51) Int. Cl.[7] .................................................. B60R 22/36
(52) U.S. Cl. .......................... 280/806; 280/807; 180/271; 297/478; 297/480
(58) Field of Search ................................ 280/801.1, 806, 280/807; 180/268, 271; 297/477, 478, 480; 340/435, 436, 903

(56) References Cited

U.S. PATENT DOCUMENTS

| | | | |
|---|---|---|---|
| 4,600,913 | * | 7/1986 | Caine ..................................... 340/435 |
| 4,659,108 | * | 4/1987 | Sack et al. ............................ 280/807 |
| 5,091,726 | | 2/1992 | Shyu . |
| 5,309,137 | | 5/1994 | Kajiwara . |
| 5,331,561 | | 7/1994 | Barrett et al. . |
| 5,339,075 | | 8/1994 | Abst et al. . |
| 5,410,304 | | 4/1995 | Hahn et al. . |
| 5,502,432 | | 3/1996 | Ohmamyuda et al. . |
| 5,521,580 | | 5/1996 | Kaneko et al. . |
| 5,552,986 | * | 9/1996 | Omura et al. ..................... 280/806 X |
| 5,558,370 | * | 9/1996 | Behr ....................................... 280/806 |
| 5,566,978 | | 10/1996 | Fleming et al. . |
| 5,599,070 | | 2/1997 | Pham et al. . |
| 5,626,359 | * | 5/1997 | Steffens, Jr. et al. ............ 180/268 X |
| 5,635,922 | | 6/1997 | Cho et al. . |
| 5,639,120 | * | 6/1997 | Kmiec et al. ......................... 280/806 |
| 5,641,131 | | 6/1997 | Schmid et al. . |
| 5,660,346 | | 8/1997 | Dick . |
| 5,670,853 | | 9/1997 | Bauer . |
| 5,671,190 | | 9/1997 | Kroemer et al. . |
| 5,788,281 | * | 8/1998 | Yanagi et al. ......................... 280/806 |
| 5,835,007 | * | 11/1998 | Kosiak ................................. 340/436 |
| 5,835,873 | * | 11/1998 | Darby et al. ..................... 180/268 X |
| 6,012,008 | * | 1/2000 | Scully ................................... 340/903 |
| 6,088,640 | | 7/2000 | Breed . |

FOREIGN PATENT DOCUMENTS

34796 * 7/1997 (JP) .

* cited by examiner

Primary Examiner—Brian L. Johnson
Assistant Examiner—Bryan Fischmann
(74) Attorney, Agent, or Firm—Tarolli, Sundeim, Covell, Tummino & Szabo L.L.P.

(57) ABSTRACT

A vehicle occupant protection system (10) includes a sensor (16) which is effective to sense a distance between a vehicle (12) and an object (14) adjacent to the vehicle (12). The sensor (16) also is effective to provide a sensor signal (18) indicative of the distance between the vehicle (12) and the adjacent object (14). The system (10) also includes a length of seat belt webbing (26) extensible about an occupant (28) of the vehicle. An actuatable mechanism (22) is operatively connected with the webbing (26). The actuatable mechanism (22) is operable to effect a tightening of the webbing (26) around the vehicle occupant (28) upon the sensor signal (18) indicating that the distance between the vehicle (12) and the adjacent object (14) is within a predetermined distance.

8 Claims, 3 Drawing Sheets

SEAT BELT TIGHTENING APPARATUS

TECHNICAL FIELD

The present invention relates to a seat belt apparatus and, more particularly, to an apparatus for tightening the webbing of a seat belt assembly around a vehicle occupant.

BACKGROUND OF THE INVENTION

A conventional seat belt assembly includes a length of webbing which may be extended around a vehicle occupant to help restrain the occupant during a vehicle crash event. The seat belt assembly typically includes a retractor which winds part of the seat belt webbing around a spool. Seat belt assemblies generally allow for substantial movement of a belted passenger. This may result in the occupant being out of position during a vehicle crash event. The benefits from various other occupant protection devices, such as air bags and seat belt pretensioners, may be reduced if the occupant is out of position during their actuation.

SUMMARY OF THE INVENTION

The present invention is directed to a system for helping to protect an occupant of a vehicle. The system includes a sensor which is effective to sense a distance between the vehicle and an object adjacent to the vehicle, such as another vehicle. The sensor also is effective to provide a sensor signal indicative of the distance between the vehicle and the adjacent object. The system also includes a length of webbing extensible about a vehicle occupant. An actuatable mechanism is operatively connected with the webbing. The actuatable mechanism is operable to effect tightening of the webbing around the vehicle occupant upon the sensor signal indicating that the distance between the vehicle and the adjacent object is within a predetermined distance.

Another feature of the present invention is directed to a method for helping to protect a vehicle occupant. The method includes the step of determining a relative distance between the vehicle and an adjacent object. Upon determining that the relative distance between the vehicle and the adjacent object is within a predetermined distance, seat belt webbing of the vehicle is tightened around the vehicle occupant.

BRIEF DESCRIPTION OF THE DRAWINGS

The foregoing and other features of the present invention will become more apparent to one skilled in the art upon consideration of the following description of the present invention and the accompanying drawings in which.

DESCRIPTION OF PREFERRED A EMBODIMENT

Figure 1:
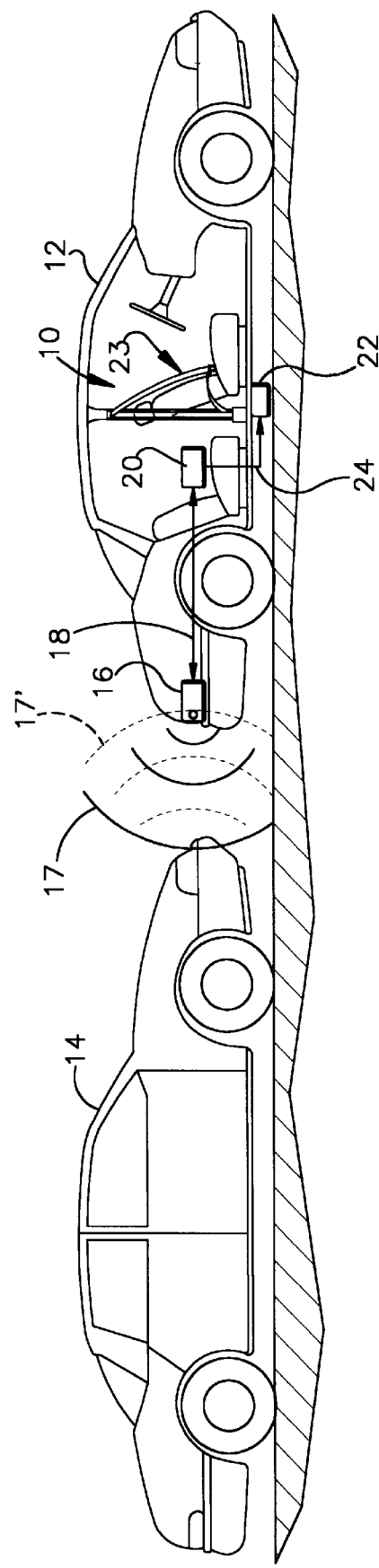
FIG. 1 is a schematic representation of a vehicle equipped with a seat belt system in accordance with a preferred embodiment of the present invention.

FIG. 1 illustrates a preferred embodiment of a system 10 installed in a vehicle 12 to help protect a vehicle occupant. In general, the system 10 is capable of detecting the relative distance between the vehicle 12 and an adjacent object, such as another vehicle 14. If the system 10 determines that the adjacent vehicle 14 is too close to the vehicle 12, the system helps to urge the vehicle occupant into a proper seated position.

In order to detect the relative distance between the first vehicle 12 and the adjacent vehicle 14, the system 10 includes at least one sensor 16 which is effective to sense the relative distance between the first vehicle 12 and the second vehicle 14. The sensor 16 may be any suitable proximity sensing device. For example, the sensor 16 could be a conventional sensing device which utilizes a suitable telemetric signal 17, such as radar waves, microwaves, sound waves (preferably ultrasonic), light waves, or other appropriate wavelengths of electromagnetic radiation that are transmitted through free space.

In the embodiment of FIG. 1, the sensor 16 emits the signal 17 to the rear of the vehicle 12. As an object, such as the vehicle 14, approaches from the rear, the sensor 16 detects its presence. Specifically, the signal 17 emitted by the sensor 16 contacts the adjacent vehicle 14 and is reflected, as indicated at 17'. At least a portion of the reflected signal 17' returns to the sensor 16.

Based on the reflected signal 17' received at the sensor 16, the sensor 16 provides a sensor signal 18 to an electronic control unit (ECU) 20. The sensor signal 18 indicates the relative distance between the vehicle 12 and an object which may be located adjacent the vehicle 12, such as the vehicle 14. The ECU 20, in turn, may provide a control signal to the sensor 16 to control operating parameters of the sensor.

Although the sensor 16 is illustrated as sensing the distance of an object to the aft of the vehicle 12, the sensor 16 might also be a multi-directional sensor or additional sensors may be provided to detect the proximity of other objects which may be located adjacent to the vehicle 12. For example, the sensor(s) 16 may detect a vehicle to either lateral side of the vehicle 12, such as is shown and described in U.S. Pat. No. 5,339,075.

The ECU 20 preferably is a microcomputer which includes a conventional microprocessor and memory preprogrammed for determining the proximity of an object to the vehicle 12 in response to the sensor signal 18. The ECU 20 also could be formed of a plurality of discrete circuit components, an integrated circuit or combination of discrete components and integrated circuits configured for controlling operation of the system 10 in accordance with the present invention. The ECU 20 also may be the central computer for the vehicle 12 and, therefore, be capable of controlling the operation of other vehicle components and accessories.

Figure 2:
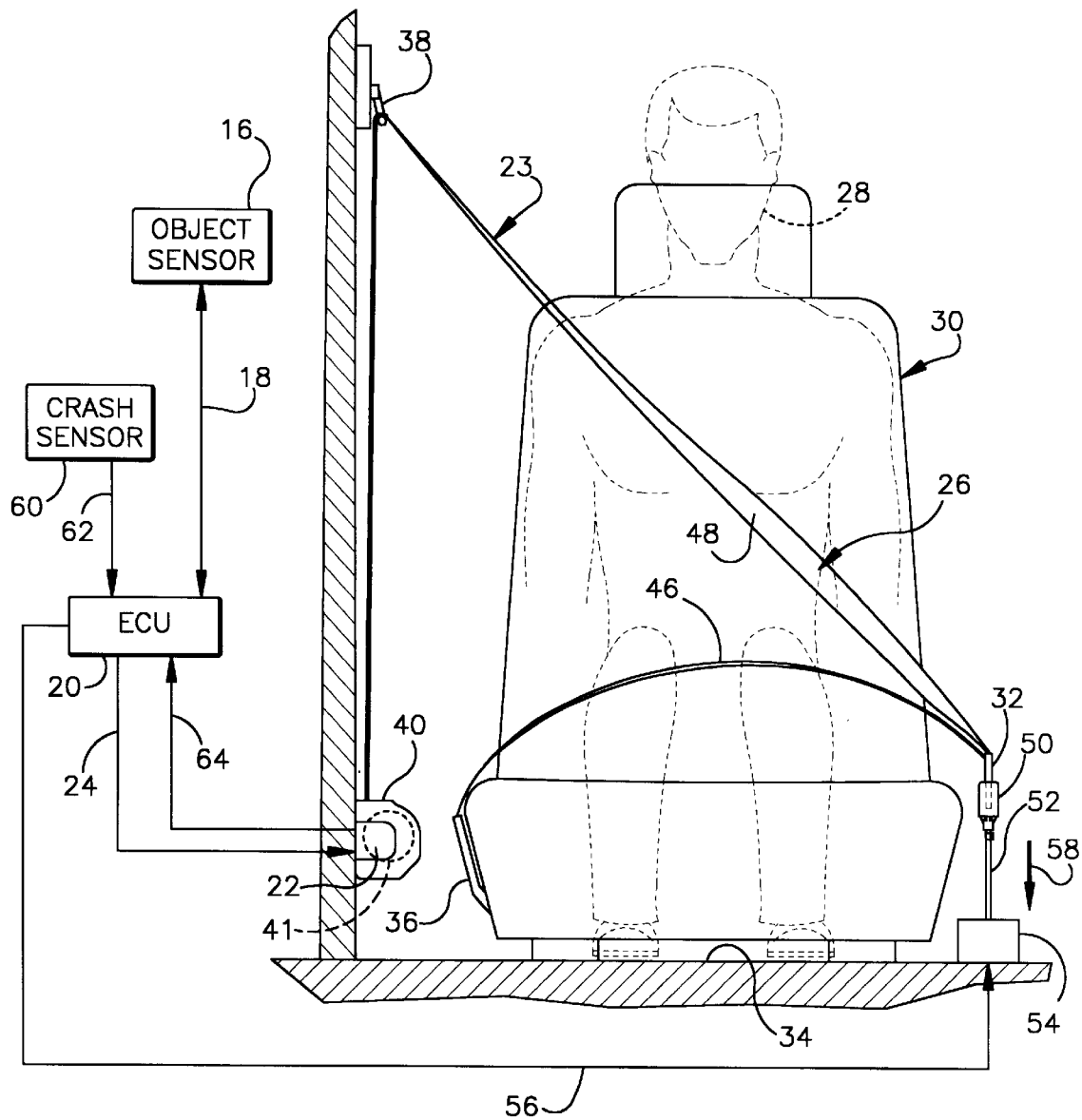
FIG. 2 is a front view, partially in section, illustrating part of FIG. 1.
Figure 3:
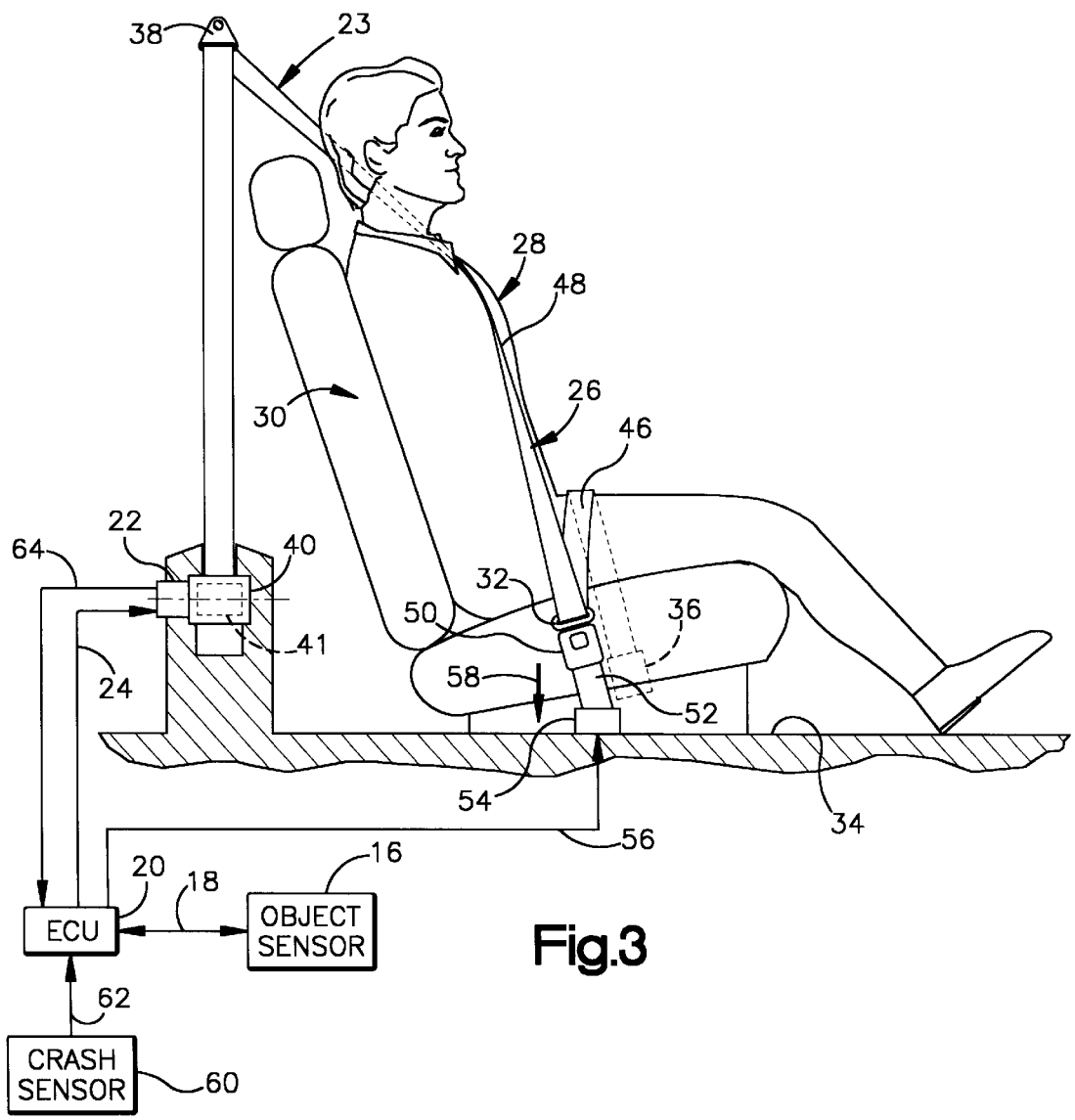
FIG. 3 is a side view, similar to FIG. 2, illustrating part of FIG. 1.

The ECU 20 is operative to control actuation of an actuatable seat belt mechanism or actuator 22 by a control signal 24. The ECU 20 controls operation of the actuator 22 upon the sensor signal 18 indicating that the distance between the vehicle 12 and the adjacent vehicle 14 is within a predetermined distance, preferably greater than zero. The actuator 22 preferably forms part of a seat belt assembly 23. Although, for purposes of simplicity of explanation, only one such assembly 23 is shown in FIGS. 1–3, it will be understood and appreciated that the vehicle 12 typically includes a similar assembly for each occupant seating location of the vehicle. The particular components of each assembly will vary depending upon the location and type of assembly. Advantageously, the system 10 may easily be adapted for use with any suitable type of seat belt assembly.

In the preferred embodiment of FIGS. 2 and 3, the seat belt assembly 23 includes a length of seat belt webbing 26 that is extensible about a vehicle occupant 28 of a vehicle seat 30. A buckle tongue 32 is slidably attached to the webbing 26. The seat belt webbing 26 is attached by a seat anchor 36 to and extends from a lower portion of one side of the seat 30. Alternatively, the webbing may be anchored to the floor of the vehicle 12. The webbing 26 extends upwardly from the seat anchor 36 and passes through a D-ring or turning loop 38.

The webbing 26 also is attached to a seat belt retractor assembly 40 fixed to the vehicle adjacent the same side of the seat as the seat anchor 36. The seat belt retractor assembly 40 includes a spool 41, which is rotatable to wind a portion of the webbing 26 around the spool within the retractor assembly. Typically, the spool 41 is biased, such as by a spring mounted within the assembly 40, to wind a portion of the seat belt webbing 26 around the spool. In addition, the retractor assembly 40 typically includes a ratchet wheel and a pawl by which the rotation of the retractor spool 41 may be locked under certain circumstances.

In the event of sudden stopping of the vehicle 12 or other sensed emergency condition, the rotation of the spool 41 may be stopped, thereby blocking withdrawal of the webbing 26 from the retractor assembly 40.

While the retractor assembly 40 of FIGS. 2 and 3 is shown to be connected to a B-pillar of the vehicle 12, it will be appreciated that other retractor mounting arrangements may be used. For example, the retractor assembly 40 may be mounted on the seat 30, as is disclosed in U.S. Pat. No. 5,599,070.

The seat belt assembly 23 is illustrated in FIGS. 2 and 3 in a belted condition. The buckle tongue 32 is adjustable along the length of the webbing 26 to divide the webbing 26 into respective lap and torso portions 46 and 48 when the webbing is belted around the vehicle occupant.

A seat belt buckle 50 is located adjacent the side of the seat 30 opposite the anchor 36 and the retractor assembly 40. The buckle 50 releasably receives the buckle tongue 32 to provide the belted condition. The buckle 50 preferably is connected to an actuatable pretensioner device 54 by a connecting element 52, such as a substantially inelastic rod or cable. Alternatively, the pretensioner device 52 may be part of the retractor assembly 40, as is described in U.S. Pat. No. 5,641,131.

The actuator 22 preferably is a motor, such as an electrical motor or a pneumatic or hydraulic actuator. The actuator 22 is operatively connected with the webbing 26. Preferably, the actuator 22 is connected to or forms part of the retractor assembly 40. Accordingly, in response to the actuation signal 24, the actuator 22 is operable to effect a tightening of the webbing 26 around the vehicle occupant 28, such as by causing the webbing to be wound on the spool 41.

The amount of tightening force exerted by the actuator 22, which may be controlled by the ECU 20, preferably is more than the amount of tightening force exerted by the rewind spring of a conventional seat belt retractor. At the same time, the tightening force will be substantially less than the tightening force exerted by a pretensioner device 54 which may be activated upon sensing a vehicle crash event.

Preferably, the actuator 22 is configured to provide a slow tightening of the webbing 26 around the occupant 28, such as when another vehicle approaches too closely. By slowly tightening the seat belt webbing 26, the occupant 28 may be moved gently from an out-of-position position to a more desirable position. This is preferably accomplished by the actuator 22 causing the seat belt webbing 26 to wind up on the spool 41 of the retractor 40. This, in turn, helps the vehicle occupant 28 into a proper position, thereby increasing the potential benefits of other occupant protection devices associated with the vehicle 12 in the event of a crash condition.

Various approaches may be used to control the amount of tightening force exerted by the actuator 22. For example, an electronic motor controller, suitably part of the ECU 20, could monitor pay-out of the webbing. This may be accomplished by including an encoder coupled with the retractor spool 41, although other pay-out sensing devices also could be used. The motor controller of the ECU 20 records a minimum pay-out point shortly after the seat belt 26 is first buckled. This may be based on a buckle switch changing states from a first condition, indicative of an unbelted condition, to a second condition, indicative of a belted condition. The switch provides a switch signal to the ECU 20 indicative of a belted or unbelted condition. Then, upon sensing the vehicle 14 within some predetermined proximity of the vehicle 12 while the occupant 28 is belted, the ECU 20 controls the actuator 22 to rewind the webbing 26 to the minimum pay-out point. Once the minimum pay-out point is reached, the ECU 20 stops the actuator 22.

Another approach would be to use a power load controller to identify when the resistance to rewinding the webbing 26 is excessive. Preferably, this is based on an electrical current sensor sensing the current supplied to the actuator. The current sensor provides a signal indicative of the amount of electrical current being drawn by the actuator 22. When the current draw of the actuator 22 exceeds a predetermined level, the ECU 20 deactivates the actuator to stop the rewind operation. This also could be coupled with a dwell time to ensure that the vehicle occupant is actually in position before terminating the rewind operation.

Yet another approach would be to use a torque controlled slipping clutch operatively coupled with the shaft of the actuator 22 or an associated gear. Upon reaching a predetermined resistant torque, the clutch would slip, thereby stopping the winding of the webbing 26 onto the spool 41.

Still another approach would be to employ a tension monitor coupled with the rewind spring of the retractor assembly 40. The tension monitor is electrically coupled to the ECU 20 or to an external motor controller. As the webbing 26 is payed out, the spring tension increases. The tension monitor provides a tension signal to the ECU 20 indicative of the amount of spring tension. After the seat belt assembly 23 is first buckled, the tension monitor provides a signal to the ECU 20 indicative of a minimum amount of tension, which is appropriately stored in suitable memory. Upon detecting a vehicle or other object in close proximity, the ECU 20 activates the actuator 22 until the tension signal indicates that the webbing 26 is rewound to the recorded minimum tension point. Once the minimum tension point is reached, the ECU 20 terminates the rewinding.

In view of these exemplary alternative approaches for controlling or limiting the tightening of the webbing 26, it will be understood and appreciated that those skilled in the art will likely perceive other approaches. These alternative approaches are contemplated to be within the scope of the present invention.

The ECU 20 may terminate or limit the tightening of the webbing 26 by controlling the actuator 22 in response to a signal 64. The signal 64 is indicative of the amount or extent of the tightening of the webbing 26. The signal 64, for example, may be supplied directly from the actuator 22 or from any other associated device, such as those described above.

The ECU 20 also may be configured to control the amount or rate of tightening as a function of the relative distance between the vehicle 12 and the adjacent object. For example, as the distance between the vehicle 12 associated with the system 10 and an adjacent object decreases below a threshold value, the amount of tightening may correspondingly increase. This also may be accomplished by providing several different threshold values for different relative distances, which thresholds correspond to different amounts or rates of tightening.

The threshold value itself also may vary as a function of the vehicle speed. For example, because a safe driving distance between vehicles generally increases with an increase in vehicle speed, the threshold distance value also may increase as a function of vehicle speed. It will be appreciated, however, that the rate and amount of tightening provided by the actuator 22 should be substantially less than provided by a conventional webbing pretensioner device and is likely to remain substantially constant during activation. In this way, the system 10 is generally unobtrusive to vehicle occupants.

The system of FIGS. 2 and 3 also includes a pretensioner device 54. The particular embodiment of pretensioner device 54 illustrated is electrically connected with the ECU 24 and operable to pull the seat belt buckle 50 toward the vehicle floor 34 in response to an actuation signal 56 from the ECU 20. When the pretensioner device 54 is actuated by the actuation signal 56, the pretensioner device effects a rapid and forceful downward movement of the seat belt buckle 50, as indicated by arrow 58. This results in a rapid and forceful tightening of the seat belt webbing 26 around the vehicle occupant 28 to help restrain the occupant during a vehicle crash event. It will be appreciated that the particular type of pretensioner device is a matter of design choice, as any suitable pretensioner device may be used in connection with the system 10.

In order to detect a vehicle crash event, the system 10 includes crash sensor 60 electrically connected with the ECU 20. The crash sensor 60 provides a crash sensor signal 62 having an electrical characteristic indicative of a sensed vehicle crash event. Preferably, the crash sensor 60 is an accelerometer, although the crash sensor may be any suitable crash event sensing device. For example, the crash sensor 60 may be an inertia sensing device, a crush sensor, or a vehicle rollover sensor.

In view of the foregoing description of the system 10, it will be appreciated that the system 10 provides an apparatus for helping to protect a belted vehicle occupant 28 as the possibility of a crash event increases. This is accomplished by the ECU 20 determining the distance between the vehicle 12 and an adjacent object, such as the vehicle 14 of FIG. 1.

Upon the ECU 20 determining that the adjacent object is within a predetermined distance from the vehicle 12, the ECU 20 provides an activation signal 24 to activate the actuator 22. The actuator 22, in turn, tightens the seat belt webbing 26 around the vehicle occupant 28. The predetermined distance, which preferably is greater than zero, is based on a preselected threshold having a value indicative of a distance which poses an increased risk of a crash event. The threshold value may be determined empirically or as a matter of design choice. Preferably, the tightening occurs slowly and with an amount of tightening force comparable to that of a conventional retractor so as not to startle or cause undue discomfort to the vehicle occupant 28. The amount of tightening, however, should be sufficient to urge the occupant into a proper seated position.

The ECU 20 continues to provide the actuation signal 24 to the actuator mechanism 22 while the external object, such as the second vehicle 14, is within the threshold distance. Upon determining that the relative distance between the vehicle 12 and the second vehicle 14 is no longer within the threshold distance, the tightening of the seat belt webbing 26 is discontinued. Specifically, the ECU 20 discontinues providing the actuation signal 24 to the actuator mechanism 22.

It will be understood and appreciated that, rather than providing a continued actuation signal 24 from the ECU 20 to the actuator mechanism, the ECU 20 may simply provide a first signal to the actuator mechanism 22 to effect the tightening of the seat belt webbing 26. Upon determining that the object is no longer within the threshold distance, the ECU 20 would then provide a termination signal to the actuator 22 instructing it to discontinue the tightening of the seat belt webbing 26. The actuator 22 or other control devices, such as described above, may provide a signal to the ECU 20 to help limit and/or control the amount of tightening.

The ECU 20 also may control other occupant protection devices, such as the pretensioner device 54. Typically, the control of such other occupant protection devices will be in response to the crash sensor 60 sensing a vehicle crash event. Accordingly, upon the crash sensor signal 62 indicating a vehicle crash event, the ECU 20 effects actuation of the pretensioner device 54. The pretensioner device 54 provides an amount of tightening of the seat belt webbing 26 which is substantially greater and/or more rapid than that applied by the actuator mechanism 22.

Advantageously, as the possibility of a vehicle crash event increases, the system 10 assists the vehicle occupant 28 to maintain a proper upright position in the vehicle seat 30. By promoting a proper seating position of the vehicle occupant 28, the benefits to the occupant from other associated occupant protection devices, such as the pretensioner device 54 or an air bag, may be improved during a vehicle crash event.

From the above description of the invention, those skilled in the art will perceive improvements, changes and modifications. Such improvements, changes and modifications within the skill of the art are intended to be covered by the appended claims.

What is claimed is:

1. A vehicle occupant protection system for a vehicle comprising:

two sensors, a first sensor sensing a distance between the vehicle and an object adjacent to the vehicle and generating a first sensor signal indicative of the distance between the vehicle and the adjacent object, a second sensor sensing the occurrence of a vehicle crash event and generating a second sensor signal indicative of the occurrence of the vehicle crash event;

a seat belt assembly, the seat belt assembly including a length of webbing, a buckle tongue, and a buckle, the length of webbing being extensible about an occupant of the vehicle, the buckle tongue being slidably attached to the webbing, the buckle releasably receiving the buckle tongue;

a retractor assembly, the retractor assembly having an actuator, a spool, and a spring, the retractor being located on a side of the vehicle seat opposite the buckle, the spool being rotatable to wind a portion of the webbing around the spool, the spring applying a first tightening force to the webbing by rotating the spool to wind a portion of the webbing around the spool;

the actuator applying a second tightening force to the webbing by further rotating the spool to wind a portion of the webbing around the spool when the first sensor signal indicates that the distance between the vehicle and the adjacent object is within a predetermined distance, the second tightening force being greater than the first tightening force; and an actuatable pretensioner device being attached to the buckle, the actuatable pretensioner causing downward movement of the buckle to apply a third tightening force to the webbing when the second sensor signal indicates the occurrence of the vehicle crash event, the third tightening force being greater than both the first and the second tightening forces.

2. The vehicle occupant protection system as in claim 1 further being defined by:

the actuator being an electric motor.

3. The vehicle occupant protection system as in claim 1 further being defined by:

an electronic control unit receiving the first and the second sensor signals and controlling the actuation of the actuator of the retractor assembly and the actuatable pretensioner.

4. The vehicle occupant protection system as in claim 3 further being defined by:

the electronic control unit recording a minimum pay-out point of webbing from the spool of the retractor assembly when the buckle tongue is first received by the buckle, upon receiving the first sensor signal the electric control unit controlling the actuator of the retractor assembly to rewind the webbing about the spool to the minimum pay-out point.

5. The vehicle occupant protection system as in claim 4 further being defined by:

the buckle having a switch with a first condition indicative of the buckle tongue being unbuckled and a second condition indicative of the buckle tongue being buckled, the electronic motor controller recording the minimum pay-out point when the buckle switch changes from the first condition to the second condition.

6. The vehicle occupant protection system as in claim 5 further being defined by:

the electronic control unit controlling the actuator to vary the rate of the second tightening force dependent upon the distance between the vehicle and the adjacent object sensed by the first sensor.

7. The vehicle occupant protection system as in claim 1 further being defined by:

the retractor assembly further including a ratchet wheel and a pawl for locking rotation of the spool within the retractor assembly, the ratchet wheel and the pawl locking rotation of the spool when the actuatable pretensioner causes downward movement of the buckle.

8. The vehicle occupant protection system as in claim 1 further being defined by:

the second tightening force of the webbing occurring at a slower rate of speed than the third tightening force of the webbing.

* * * * *

UNITED STATES PATENT AND TRADEMARK OFFICE
CERTIFICATE OF CORRECTION

PATENT NO. : 6,213,512 B1
DATED : April 10, 2001
INVENTOR(S) : Timothy A. Swann et al.

It is certified that error appears in the above-identified patent and that said Letters Patent is hereby corrected as shown below:

Column 8,
Line 10, change "5" to -- 3 --.

Signed and Sealed this

Thirteenth Day of August, 2002

Attest:

Attesting Officer

JAMES E. ROGAN
Director of the United States Patent and Trademark Office